(12) United States Patent
Jansson

(10) Patent No.: US 9,143,540 B2
(45) Date of Patent: Sep. 22, 2015

(54) SYSTEM AND METHOD FOR PROVIDING SERVICE CORRELATION IN A SERVICE ACCESS GATEWAY ENVIRONMENT

(75) Inventor: Daniel Jansson, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 2042 days.

(21) Appl. No.: 12/188,392

(22) Filed: Aug. 8, 2008

(65) Prior Publication Data

US 2009/0268715 A1 Oct. 29, 2009

Related U.S. Application Data

(60) Provisional application No. 61/047,694, filed on Apr. 24, 2008.

(51) Int. Cl.
- *G06F 15/16* (2006.01)
- *H04L 29/06* (2006.01)
- *H04M 15/00* (2006.01)

(52) U.S. Cl.
CPC .............. *H04L 65/40* (2013.01); *H04L 65/102* (2013.01); *H04M 15/00* (2013.01); *H04M 15/41* (2013.01); *H04M 15/62* (2013.01); *H04M 15/8016* (2013.01); *H04M 2215/0164* (2013.01); *H04M 2215/7414* (2013.01)

(58) Field of Classification Search
CPC ..... H04M 15/00; H04M 15/41; H04M 15/61; H04M 15/8016
USPC .................................. 709/206, 228
See application file for complete search history.

(56) References Cited

U.S. PATENT DOCUMENTS

| 5,448,730 | A | 9/1995 | Bakita |
| 6,336,135 | B1 | 1/2002 | Niblet |
| 7,243,742 | B2 * | 7/2007 | Kutryk ........................... 175/314 |
| 7,249,195 | B2 * | 7/2007 | Panec et al. ................... 709/238 |
| 7,424,282 | B2 * | 9/2008 | Barbeau ...................... 455/404.1 |
| 2004/0087336 | A1 * | 5/2004 | Payrits et al. ................. 455/557 |
| 2006/0221893 | A1 * | 10/2006 | Kiss .............................. 370/328 |
| 2007/0077922 | A1 * | 4/2007 | Kim et al. .................. 455/414.2 |
| 2007/0094283 | A1 * | 4/2007 | Fung et al. ..................... 707/101 |

(Continued)

FOREIGN PATENT DOCUMENTS

WO 2005027455 3/2005

OTHER PUBLICATIONS

Hanemann, Andreas et al., "Service-Oriented Event Correlation-the MNM Service Model Applied to E-Mail Services," 2004, Munich Network Management Team, 11th International Workshop, All pages.*

(Continued)

*Primary Examiner* — Douglas Blair
(74) *Attorney, Agent, or Firm* — Tucker Ellis LLP

(57) ABSTRACT

A network service access gateway is described that provides service correlation for incoming and outgoing invocations. The service requests can be received to the gateway from telecommunication mobile devices as well as from external service provider applications. A first service request can be received to the gateway and processed. The service correlation identifier (SCID) of the request can be persisted within the gateway prior to forwarding the request to the recipient. When a second and related service invocation is later received to the gateway, the two invocations can be associated based on the SCID. Based on the association, various custom functionality can be performed, such as invoking the charging system to treat the multiple services as a single unified transaction.

20 Claims, 8 Drawing Sheets

(56) References Cited

U.S. PATENT DOCUMENTS

| | | | |
|---|---|---|---|
| 2007/0104186 A1* | 5/2007 | Kramer et al. | 370/352 |
| 2007/0104208 A1* | 5/2007 | Svensson | 370/412 |
| 2007/0110083 A1* | 5/2007 | Krishnamoorthy et al. | 370/401 |
| 2007/0204017 A1* | 8/2007 | Maes | 709/223 |
| 2008/0089344 A1 | 4/2008 | Jansson et al. | |
| 2008/0154657 A1 | 6/2008 | Nayak | |
| 2008/0162634 A1* | 7/2008 | Johns | 709/204 |
| 2010/0005477 A1* | 1/2010 | Bovet et al. | 719/313 |

OTHER PUBLICATIONS

Osdir, "Correlation ID of response messages when using SOAP/JMS," downloaded from http://osdir.com/ml/java.xfire.devel/2007-06/msg00155.html on Nov. 10, 2008, 2 pages.

Waizer, Carlos, "How to correlate request/response messages by using System.Messaging." downloaded from http://support.microsoft.com/kb/555298 on Nov. 11, 2008, 2 pages.

Sun Microsystems, Inc., "Web Service Communication Patterns," Designing Web Services with the J2EE 1.4 Platform http://java.sun.com/blueprints/guidelines/designing_webservices/html/architecture5.html, 4 pages. (2004).

BEA Systems, "Web Services Architecture Usage Scenarios," working draft Jul. 30, 2002, 48 pages. (2002).

Adams, Holt, "Asynchronous Operations and Web Services, Part 1: A Primer on Asynchronous Transactions," downloaded from http://www.ibm.com/developerworks/library/ws-asynch1.html, 3 pages. (Apr. 1, 2002).

* cited by examiner

SYSTEM AND METHOD FOR PROVIDING SERVICE CORRELATION IN A SERVICE ACCESS GATEWAY ENVIRONMENT

CLAIM OF PRIORITY

The present application claims the benefit of U.S. Provisional Patent Application No. 61/047,694 entitled SYSTEM AND METHOD FOR PROVIDING SERVICE CORRELATION IN A SERVICE ACCESS GATEWAY ENVIRONMENT, filed on Apr. 24, 2008, which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to telecommunications and service gateways and more particularly to correlating service calls and invocations within a service access gateway.

BACKGROUND

With the ever-increasing popularity of the World Wide Web, more and more previously unrelated technologies are becoming integrated with the enormous network of information and functionality that the internet provides. Everything from television and radio to books and encyclopedias are becoming available online, amongst a wide variety of other technologies. One such area of technology is telephony and the related telecommunications services.

Conventionally, telecommunications and network infrastructure providers have relied on often decades-old switching technology to providing routing for network traffic. Businesses and consumers, however, are driving industry transformation by demanding new converged voice, data and video services. The ability to meet these demands can often be limited by existing IT and network infrastructures that are closed, proprietary and too rigid to support these next generation services. As a result, telecommunications companies have been transitioning from traditional, circuit-switched Public Switched Telephone Networks (PSTN), the common wired telephone system used around the world to connect any one telephone to another telephone, to Voice Over Internet Protocol (VoIP) networks. VoIP technologies enable voice communication over "vanilla" IP networks, such as the public Internet. Additionally, a steady decline in voice revenues has resulted in heightened competitive pressures as carriers vie to grow data/service revenues and reduce churn through the delivery of these more sophisticated data services. Increased federal regulation, security and privacy issues, as well as newly emerging standards can further compound the pressure.

Delivering these more sophisticated data services has proved to be more difficult than first imagined. Existing IT and network infrastructures, closed proprietary network-based switching fabrics and the like have proved to be too complex and too rigid to allow the creation and deployment of new service offerings.

While the worlds of TCP/IP applications and of telephony networks continue to converge, the relationship between them has often been overly complex and difficult to manage for various organizations, as well as for consumers. In recent times, specialized telecommunication servers and various service gateway applications have emerged to enable simpler ways for developers to include telephony-based functionality in their software applications, as well as provide increased security and stability. Nevertheless, these specialized solutions continue to need improvements in performance generally required by network operators and demanded by their subscribers. As an example, a desirable feature within this context is the ability to associate various atomic operations in telecommunications network.

DETAILED DESCRIPTION

Figure 1:
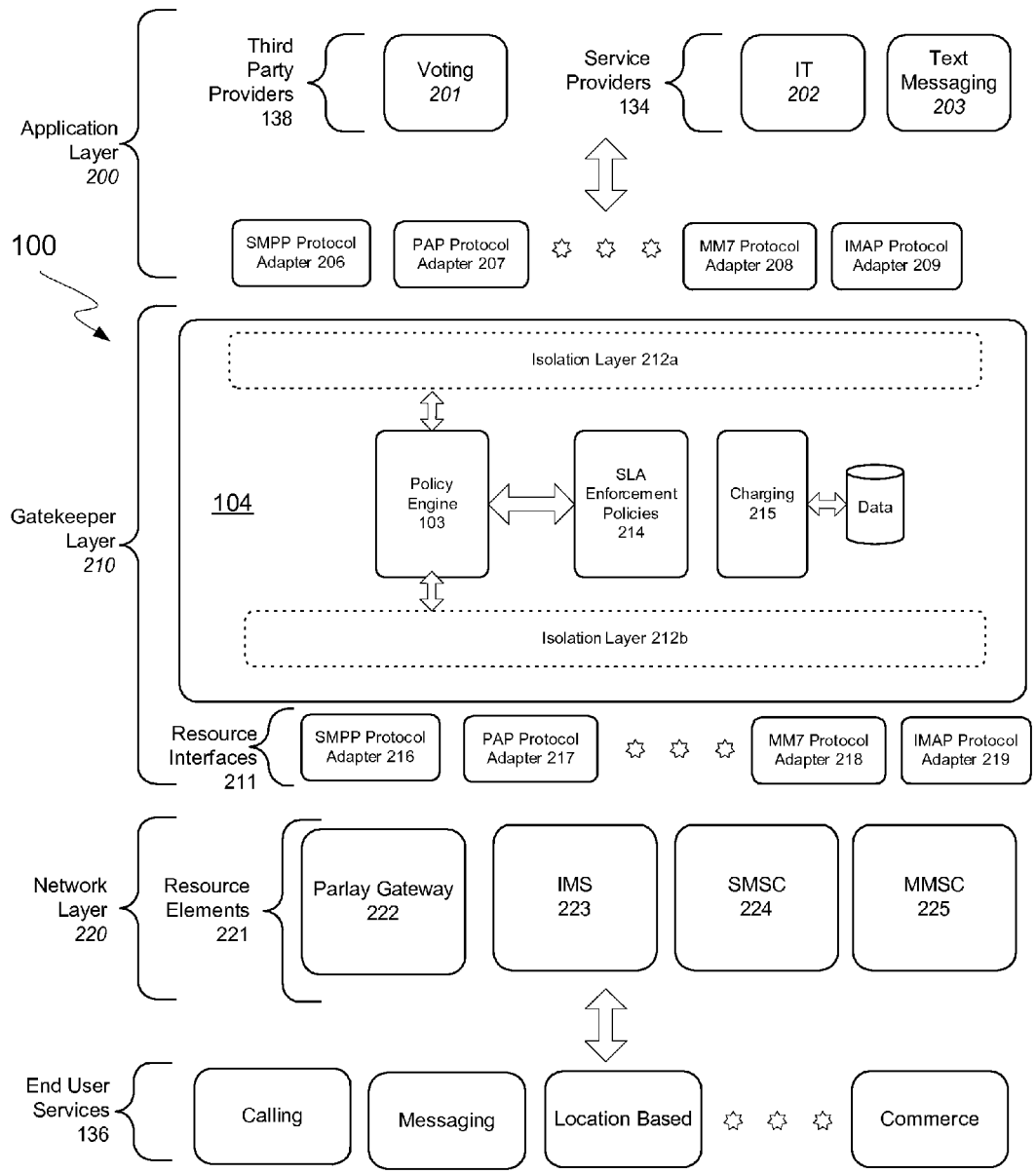
FIG. 1 is an illustration of a network gatekeeper that can be used in conjunction with the service correlation in accordance with various embodiments.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a server or a router. Furthermore, it can also be apparent to those skilled in the art that such components, regardless of how they are combined or divided, can execute on the same computing device or can be distributed among different computing devices connected by one or more networks or other suitable communication means.

In accordance with the embodiments of the invention, there are provided mechanisms and methods for maintaining service correlations within a service access gateway. The service gateway can be deployed by a telecommunications provider in order to manage access by various applications to its network and its various subscriber clients. In one embodiment, a service invocation request can be received from a third party application or from a client device to the service gateway. This service invocation can have a service correlation identifier (SCID) associated therewith. In one embodiment, the SCID can be set by the third party application. Alternatively, the SCID can be set by another entity such as the telecommunications provider, an application executing on a subscriber client device or can be generated by the service gateway.

Once the invocation is received, the service correlation identifier can be retrieved and persisted into an event data record (EDR) by the service access gateway. These event data records can contain various types of information associated with the service requests going through the gateway, including information regarding which service calls were correlated with each other. In one embodiment, the service correlation identifier can be retrieved from the simple object access protocol (SOAP) header of a web service request transmitted by an application. The SCID can then be captured and stored into a request context. The request context can maintain metadata associated with the request in the service access gateway. In another embodiment the SCID can be read from the metadata associated with a request transmitted by a client subscriber. In any event, the request can be forwarded by the service access gateway to the recipient component so that is can be handled thereon.

Subsequently, another service invocation can be received to the service gateway. This new service invocation may or may not be technically related to the first service invocation. In the event that the two calls are related, the service access gateway can associate the two requests based on the service correlation identifier. An application programming interface (API) is provided for an external entity to invoke a customized service correlation service in order to perform various customized functionality based on the correlation of the two (or more) service calls. Additionally, in the event that the service call was received from the client device, the SCID can be attached to the SOAP header prior to forwarding the request to the service provider application.

In various embodiments, the service correlation feature described above can be used to create associations among various atomic operations within the telecom service network and to invoke desired functionality based on those associations. As an example, a telecommunications operator may wish to combine and correlate series of SMS messages, MMS messages and mobile location lookups and treat the series of communications as a single transaction (e.g. a single charge). This could be used to create a service that receives an SMS from a subscriber, performs a user location lookup on the subscriber and based on the location sends out some content to the subscriber in the form of an MMS. One illustration of this is a mobile user that sends an SMS to an application asking for a particular restaurant place nearest to his/her current location. The application can then make a terminal location request to find the user's current location, look up the address of the closest restaurant that fits the criteria, and then sends the user an MMS with all the appropriate information (map, directions, etc.). In order to charge correctly for the delivery of this type of service, it would be desirable for the operator to correlate the SMS with the user location request and the MMS. This can be done via the service correlation identifier described above.

Various alternative scenarios are possible and can make use of the ability to correlate services within a service gateway. For example, a combinational transaction could be created where the user looking at an online map can send a text message and a picture(s) to another user. As another example, a third party application may wish to associate a short message service (SMS) text message with a response to that SMS message in order to allow the application to track the status of the message and whether it was received. Yet another use case can be combining requests with responses and allowing them to be treated as single unified transactions. A multitude of other uses and implementations will be apparent to one of ordinary skill in the art based on the correlation of services within the telecom service gateway.

In various embodiments, the service correlation can be implemented in a network gatekeeper application built on top of a JAVA 2 Enterprise Edition (J2EE) compliant application server. The network gatekeeper can provide a policy driven telecommunications web services gateway that allows granular control over access to network resources from un-trusted domains. In one embodiment, the network gatekeeper can be an application deployed by a telecom provider in order to manage access to its network by the third party services that are offered to the various subscribers of the telecom provider.

As an illustration, most operators and telecommunication providers expect to drastically increase the portfolio of services offered to their customers to hundreds and even thousands of content and application offerings. While some of these services may be developed in-house (and thus be deployed on an internal network), the vast majority of such services will likely come from third party service providers and partners. This creates a need to handle the network and application integration with such third party services, as well as manage the entire ecosystem to the satisfaction of the consumers. The network gatekeeper application can provide a secure common entry point for third party applications accessing network resources both through telecom web services interfaces and through policy-based, secure and extensible network interfaces. In one embodiment, the network gatekeeper can include a service level agreement (SLA) based policy enforcement engine, which can enforce third-party partner SLA policies at runtime. It can also enable network operators to dynamically customize partner SLA data and access rules to fit traffic prioritization models and the capacity of each individual network node.

Additionally, the network gatekeeper can provide rich traffic management and shaping features, as described throughout the present disclosure. This can allow operators to create deterministic traffic management solutions, distribute traffic internally throughout the network and increase the availability and reliability of services.

The network gatekeeper can be deployed on the telecom operator network in multiple tiers of deployment—a stateless access tier and a stateful network tier. In one embodiment, the two tiers implement a firewall in between them for greater security. The stateless access tier can serve as an entry point for (possibly un-trusted) third party applications into the network. The network tier which integrates with the internal network can be shielded from the applications by the access tier.

In various embodiments, the service correlation can be implemented within the network tier of deployment. As a request comes into the access tier of the network gateway from an application, the handler handling the request can inspect the request context and retrieve the service correlation identifier (SCID). In one embodiment, the request context includes various data associated with the request received to the gateway, including the SCID. It should be noted that the system need not specifically implement the request context and that any other object that contains or specifies data associated with the service invocation can be used. It should also be noted that the service correlation feature can also be implemented with invocations received from subscriber clients from the internal network of the telecom provider, as will be illustrated in other portions of this disclosure.

Once the SCID is retrieved at the access tier, it can be placed into the work context of the network gateway. In one embodiment, the work context is an object provided by the application server in order to contain data flowing through the various components of the gateway. It can be used to define properties as application context which implicitly flow across remote requests and allow downstream components to work in the context of the invoking client. Work contexts allow developers to pass properties without necessarily including them in a remote call. A work context is propagated with each remote call allowing the called component to add or modify properties defined in the work context; similarly, the calling component can access the work context to obtain new or updated properties. In the present embodiment, the SCID is placed in the work context after it has been retrieved from the request.

A work context listener can be implemented within the network tier to read the work context and to retrieve the SCID. Once it obtains the SCID, the listener can call out to an extensible application programming interface (API) provided by the network gateway in order to perform some specific functionality based on the service correlation feature. This allows the telecom operator or a third party application developer to retrieve the SCID and to use it in performing a customized function, such as charging the billing system based on the correlation of the messages and requests. In order to perform the desired functionality, the application developer can implement the API provided and can also extend it to suit the particular needs. In cases where the API is not implemented, the listener can merely return the SCID before invoking the appropriate network plug-in for the request. In either case, the gateway can allow service requests and responses to flow uninterrupted through the gateway, while capturing the correlation amongst various service calls and allowing customized functionality to be invoked based on that correlation.

In one embodiment, the information in the request context, including the SCID is included in every event data record (EDR) where the request context is accessible. Event data records are created or written to whenever a particular transaction takes place within the service access gateway. In various embodiments, the EDRs can be used to capture the information processed by the gateway. This information can then be used to track, analyze, debug and create various new applications that integrate with the network.

The figures described below illustrate the service correlation features in various contexts. It should be noted, however, that the components illustrated in the figures are not intended to limit the scope these embodiments and are provided purely for purposes of illustration and explanation.

FIG. 1 is an illustration of a network gatekeeper that can be used in conjunction with the service correlation in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

The network gatekeeper 104 provides a policy-driven telecommunications Web services gateway that allows granular control over access to network resources from un-trusted domains. This service gateway application can be deployed by a telecom provider in order to manage access to its internal network and its subscribers by external third party service provider applications.

As illustrated by way of example, an embodiment of a network gatekeeper layer 210 provides an easy to use, integrated, configuration-driven intermediary between service providers 134, third party service providers 138 and end users 136. The communications platform of a typical telecom organization can comprise an application layer 200 with interfaces to applications of the service providers 134 and third party service providers 138 and a network layer 220 to interface with the end users 136 via one or more network resource elements 221. The communications platform can further comprise a gatekeeper layer 210 interposed between the application layer 200 and the network layer 220 for managing and controlling information flowing between layers 200 and 220.

At the application layer 200, third party service providers 138 and service providers 134 are provided protocol adapters 206-209 to make services 201-203 available to callers over a network via the gatekeeper layer 210 provided by the communications platform 100. Access to network resource elements 221 by services 201, 202, 203 may be achieved using one or more web services protocol adapters 206-209. The protocol adapters 206-209 provide an interface mechanism, enabling the network gatekeeper 104 to intercept protocol communications from services 201-203 and control access to network resource elements by the services 201-203 in accordance with one or more policies. While illustrated here with reference to an embodiment having adapters to specific protocols, including without limitation, a Short Message Peer-to-Peer protocol (SMPP) protocol adapter 206, a Push Application Protocol (PAP) protocol adapter 207, a Multimedia Messaging Services (MM7) protocol adapter 208 and an Internet Message Access Protocol (IMAP) protocol adapter 209, embodiments may include any number or kind of protocols and are neither limited to, nor required to possess, these illustrated protocol adapters.

The gatekeeper layer 210 includes a gatekeeper 104 that comprises a plurality of functional elements working in concert to control access to network resource elements 221 at the network layer 220 by services 201-203 according to one or more policies. In an embodiment, a service level agreement (SLA) 214 comprises one or more policies governing access to the network layer 220. A policy engine 103 provides enforcement of the service level agreements. Service level agreements specify, e.g., how many messages a service provider sends per hour, and if over a contract limit, the service provider may start paying additional licensing to the telecom provider. In one embodiment, capabilities to create, customize, and execute service level agreement provisions as policies are provided. A charging mechanism 215 determines charges to callers for making a call using network resource elements 221, e.g., determine charges for network traffic (i.e., calls) according to charging information payment amount/schedule, priorities, and the like. Charging mechanism 215 may access data including Call Data Records (CDR) and/or Event Data Records (EDR) in order to determine charges. In one embodiment, the charging mechanism 215 determines an allocation of charges to be apportioned to the third party providing the service. As shown by the dotted lines in FIG. 1, the actions of the policy engine 103 and other functional elements of the gatekeeper 104 provide virtual isolation layers 212a, 212b between services 201-203 at the application layer 200 and network resource elements 221 at the network layer 220. The isolation layers 212a, 212b indicate that the gatekeeper layer 210 functional elements can be isolated from, and unaffected by, the particulars of protocols, interfaces and the like used by applications, services and callers communicating using the network via the gatekeeper 104.

The gatekeeper layer 210 may include one or more resource interfaces 211 to interface with legacy protocols 216-218 or other web services protocols 219 as a mechanism to reach callers and end user applications (clients) via the network layer 220. While illustrated here with reference having resource interfaces to specific protocols, including without limitation, an SMPP protocol adapter 216, a PAP protocol adapter 217, an MM7 protocol adapter 218 and an IMAP protocol adapter 219, embodiments may include any number or kind of protocols and are neither limited to, nor required to possess, these illustrated resource interfaces. An extension toolkit (not shown) enables partners to develop resource interfaces for other protocols to include into the gatekeeper layer 210.

Network layer 220 includes one or more resource elements 221 such as without limitation a Parlay (protocol) gateway 222, an IMS (IP multi-media subsystem) 223, an SMSCs (short-message-service-center) 224 and MMSCs (multi-media messaging service center) 225, each of which provides a mechanism for moving information through the network to one or more end user services 136.

Tools for interacting with Web Services, such as a Web Service—Universal Description Discovery Interface (WS/UDDI), a Web Service—Business Process Execution Language (WS/BPEL) may also be coupled to the network gatekeeper 104 in various embodiments. A log/trace and database can assist with troubleshooting. In some deployments, the network gatekeeper can interface with processes that monitor underlying network function, such as Operations Support Systems/Business Support Systems (OSS/BSS) system via RA protocol adapters. (RA protocol is a protocol for submission of billing information that are maintained in the network gatekeeper 104 and sent to a carrier's existing billing infrastructure.) Embodiments can include one or more of the following services OSS/BSS services. For example and without limitation, Operations Support Systems services can include activation, service assurance, usage/metering and provisioning, including designing, assigning and inventory. Business Support Systems can include billing, including invoicing, rating, taxation, and collections, customer management, including order entry, customer self services, customer care, trouble ticketing, and customer relationship management. Such interfaces can provide access to Operation, Administration, and Maintenance (OAM) applications and others. A policy engine can control access by one or more third party services and services to resource elements in a network layer.

Figure 2:
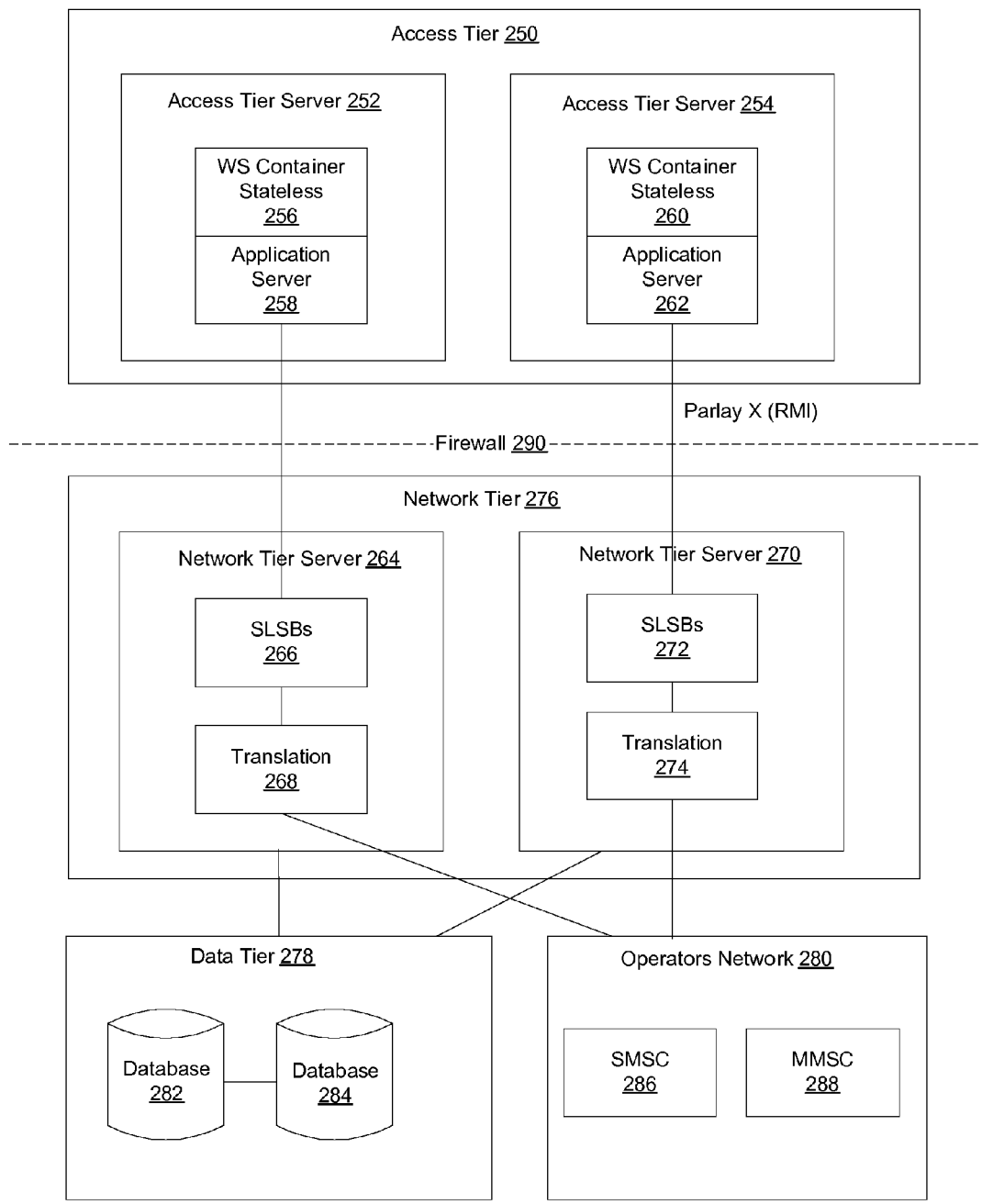
FIG. 2 is an illustration of the network gatekeeper deployment within a telecommunications network, in accordance with various embodiments.

FIG. 2 is an illustration of the network gatekeeper deployment within a telecommunications network, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the network gatekeeper can be deployed in two tiers—an access layer cluster and a network layer cluster having a firewall 290 in between. The access tier 250 is the entry point for third party applications into the operator's network. The purpose of the access tier is to provide a first level of protection from malicious applications and other potential threats against the integrity of the operator's network. In one embodiment, the access tier can be distributed across multiple access tier servers 252, 254 having an application server software 258, 262 deployed thereon. The web services stateless container 256, 260 can be implemented on top of the application server, allowing the access tier to receive requests into the access tier.

The network tier 276, which integrates with the operator's network, is shielded from applications by the access tier 250. The communications between the access tier and the network tier can be over the Parlay X Web Services as remote method invocations (RMI). The network tier can be comprised of multiple network tier servers 264, 270. In one embodiment, stateless session beans (SLSBs) 266, 272 can be deployed on the network tier servers. In addition, the network tier can include the translation logic components 268, 274, for translating the communications into specific network protocols, as previously described.

Each tier can be scaled individually by adding new servers. In one embodiment, each server in each tier is running in an active mode.

The deployment can additionally include a data tier 278 with databases 282, 284 or some other forms of persistent storage. Furthermore, the operator's network 280 typically provides a short messaging service center (SMSC) 286 and a multimedia messaging service center (MMSC) 288 to the various subscribers. The SMS center 286 and the MMS center 288 are responsible for handling the SMS operations and the MMS operations (respectively) of a wireless network. For example, when an SMS message is transmitted by a mobile phone, it reaches the SMS center 286, which can then forward the message to the recipient. In various embodiments, the main duties of the SMSC and the MMSC are to route various messages and to regulate the process.

Figure 3:
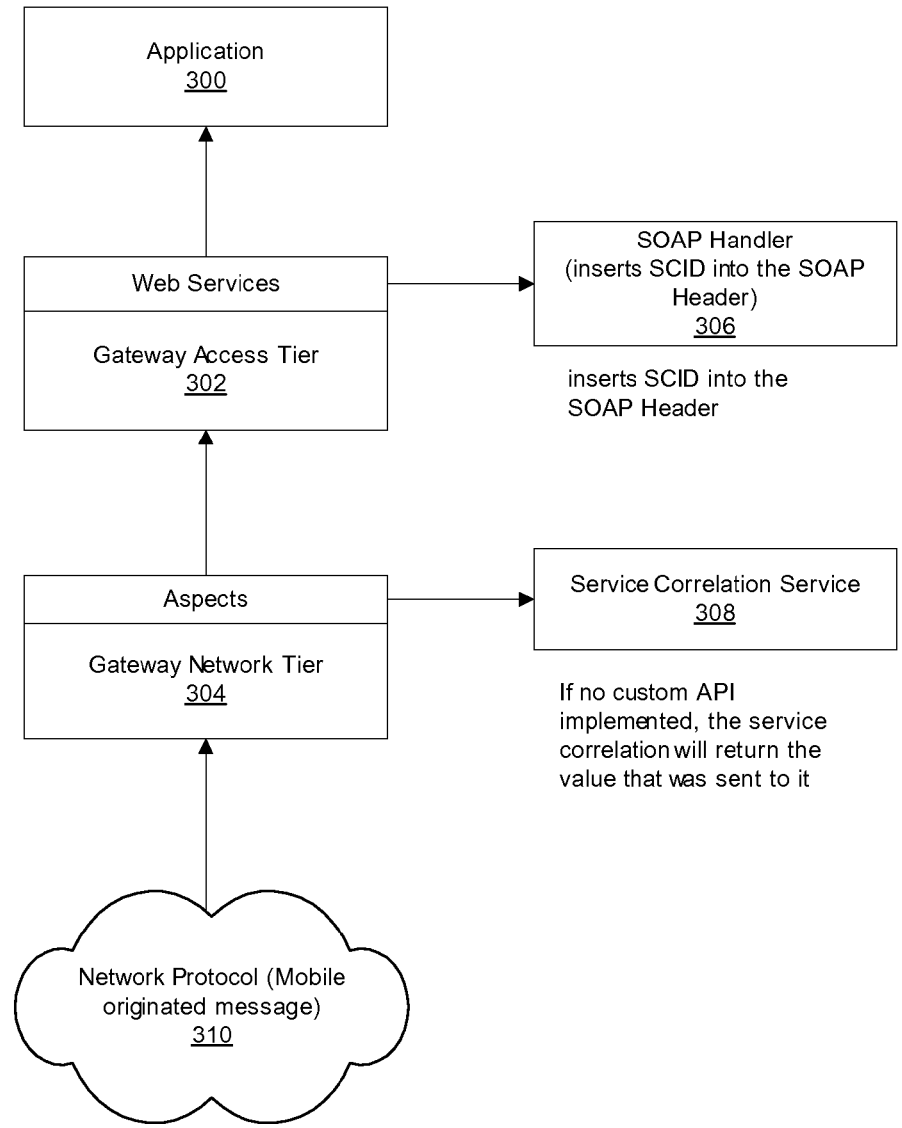
FIG. 3 is an illustration of the various components involved in service correlation within a deployment of the service access gateway, in accordance with various embodiments.

FIG. 3 is an illustration of the various components involved in service correlation within a deployment of the service access gateway, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, a mobile originated message 310 can be received from the subscriber network of the telecom provider. In this embodiment, the message is initiated by a mobile client device such as a cellular telephone, a personal digital assistant (PDA), a laptop, or some other device. However, in alternative embodiments, the message can be initiated by an external application that provides various services to the subscribers of the telecom operator (e.g. an AMERICAN IDOL™ voting application, a FACEBOOK™ application, etc.).

As shown, the message enters the service access gateway at the network tier 304. If the message is technically related to another service invocation within the gateway, a custom service correlation service 308 can be invoked from the Aspects layer. For example, if the service correlation ID of the message matches the SCID of another service invocation previously processed by the access gateway, the custom service correlation service 308 is invoked. This service 308 can perform various customized functionality based on associations among services by implementing an extensible API. If the API has not been implemented, the service correlation service 308 can merely return the value that was sent to it.

Following the illustration, the message next enters the northbound access tier 302 interface of the gateway. At this northbound interface, the message can be translated into the appropriate protocols and APIs (e.g. Web Services) in order to be processed by the service provider application. For example, at the access tier 302, the SOAP handler 306 can be invoked, which inserts the SCID into the SOAP header of the request prior to passing the message to the external application 300.

Figure 4:
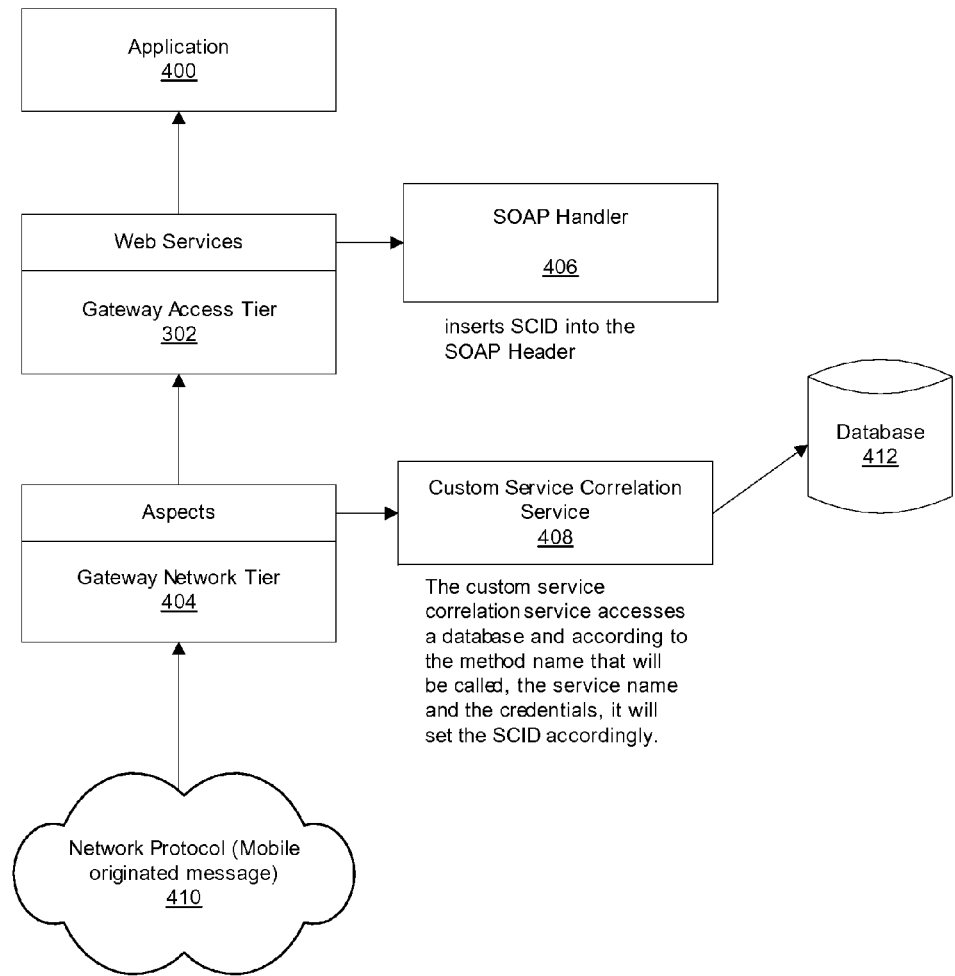
FIG. 4 is an illustration of the various components involved in service correlation within a deployment of the service access gateway, in accordance with various embodiments.

FIG. 4 is an illustration of the various components involved in service correlation within a deployment of the service access gateway, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

Similarly, to the illustration in FIG. 3, a network originated message can be received from a mobile client 410. The message is processed at the network tier 404, at which point the custom service correlation service 408 can be invoked. In this particular illustration, however, the custom correlation service accesses a database 412 and according to a method name that will be called, the service name and/or the credentials, it can set the SCID accordingly. This can be performed by implementing a custom API provided by the access gateway, which can invoke the custom functionality illustrated herein. In addition, because the SCID is captured in the EDRs of the gateway, the information can also be retrieved from this source.

The message can then continue to be processed in a similar manner to that illustrated in FIG. 3, by invoking the SOAP handler 406 from within the access tier which inserts the SCID into the SOAP header of the web service request. The message can then be appropriately forwarded to the service provider application 400.

Figure 5:
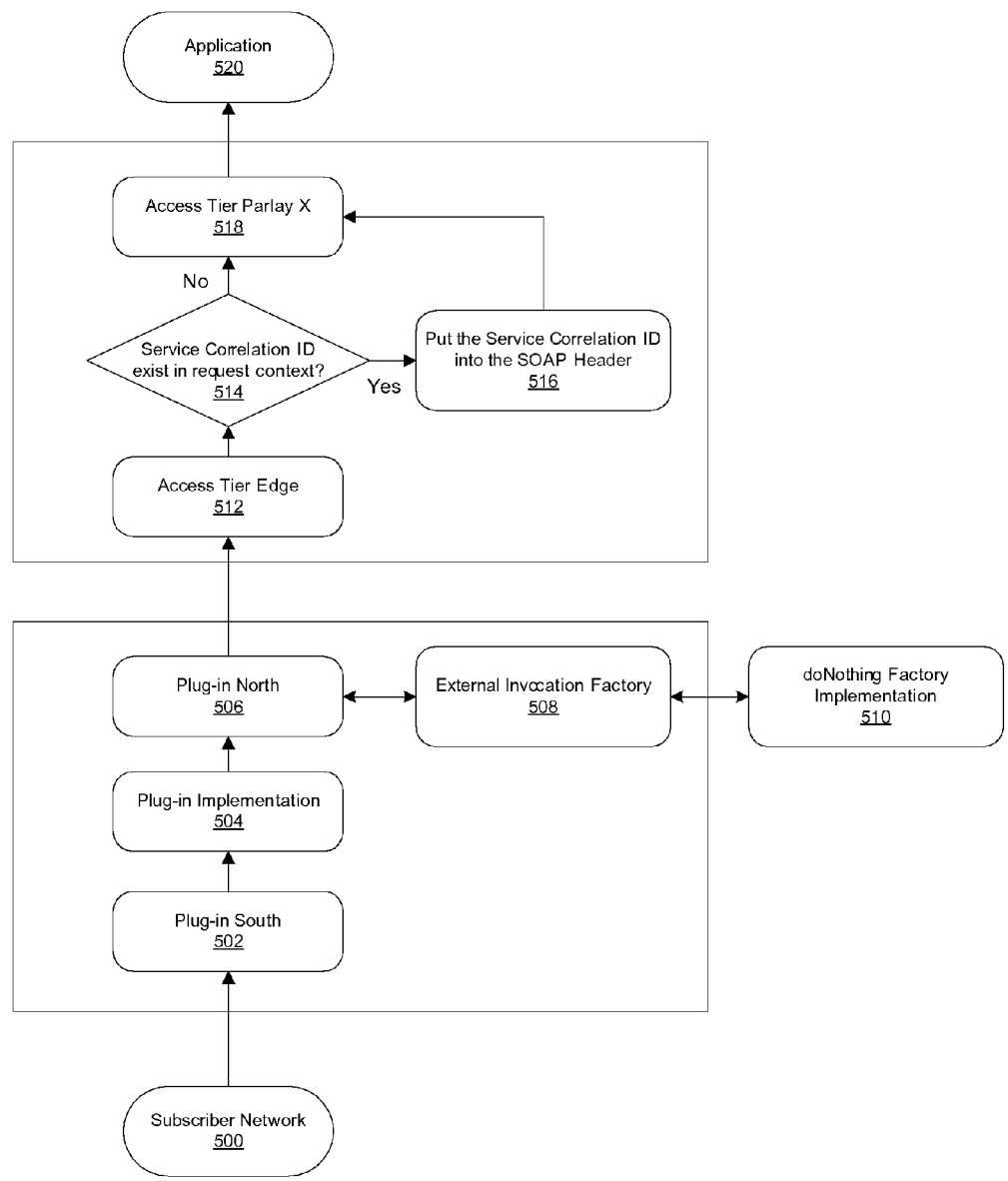
FIG. 5 is an illustration of the service correlation functionality in the context of an invocation that originates at the subscriber network level, in accordance with various embodiments.

FIG. 5 is an illustration of the service correlation functionality in the context of an invocation that originates at the subscriber network level, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the service invocation is received to the gateway from the subscriber network 500 of the telecom provider. At the network tier, the appropriate plug-ins and their implementations 502, 504, 506 can be selected in order to enable communications between the mobile devices of the subscriber network 500 and the external applications 520. For example, southbound plug-ins 502 can provide translation for communicating with the network clients via protocols such as MM7, SMPP, OSA/Parlay and the like. The northbound plug-ins, on the other hand, can provide translation for Web Services, Parlay X, EWS and the like.

In one embodiment, at the northbound plug-in layer, an external invocation factory 508 can be invoked which accesses a customized implementation. As illustrated this custom implementation is called doNothing Factory 510. If implemented, the factory can execute custom functionality based on the service correlation feature.

Continuing with the illustration, the message passes through the access tier edge 512. At this point, it can be determined if the service correlation ID exists in the request context 514. If it does, the service correlation ID can be placed into the SOAP header 516 and forwarded to the application 520 via access tier Parlay X 518. If no such SCID is found, the message can be merely forwarded without manipulating the SCID.

Figure 6:
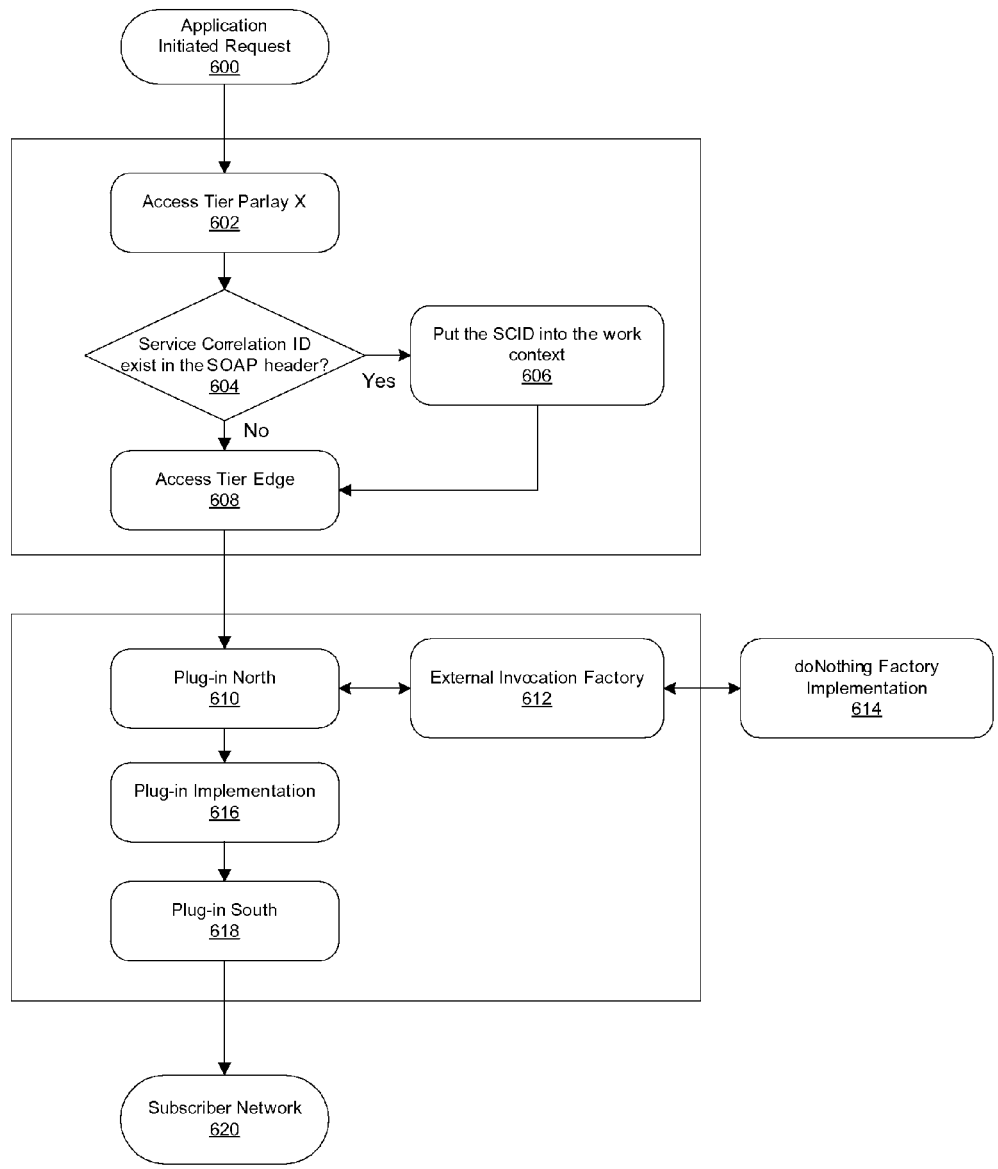
FIG. 6 is an illustration of the service correlation functionality in the context of an invocation that originates at the external service provider application level, in accordance with various embodiments.

FIG. 6 is an illustration of the service correlation functionality in the context of an invocation that originates at the external service provider application level, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, a service invocation can be initiated by the external service provider application 600. For example, the application may have received an SMS message from a subscriber and based on this message, it is initiating a user-location-lookup invocation. In this embodiment, the application initiated request comes into the network gateway through the access tier Parlay X Web Services 602. If the SCID is included in the SOAP header 604, the SCID can be read and placed into the work context 606. This allows the various components of the service access gateway to gain access to the SCID. The request can then be routed along the access tier edge 608 into the network tier. At the north plug-in 610 layer, the external invocation factory 612 and its implementation 614 can optionally invoked. If the custom APIs are not implemented, this external factory may not perform any particular function. Alternatively, the external invocation factory can manipulate data (e.g. charge the billing system) or perform other custom functionality based on the association of services in the gateway.

The application initiated request can then be routed along to the appropriate southbound plug-ins and implementations 618, 616 in order to convert the request into the format understandable by the devices in the telecom subscriber network 620.

Figure 7:
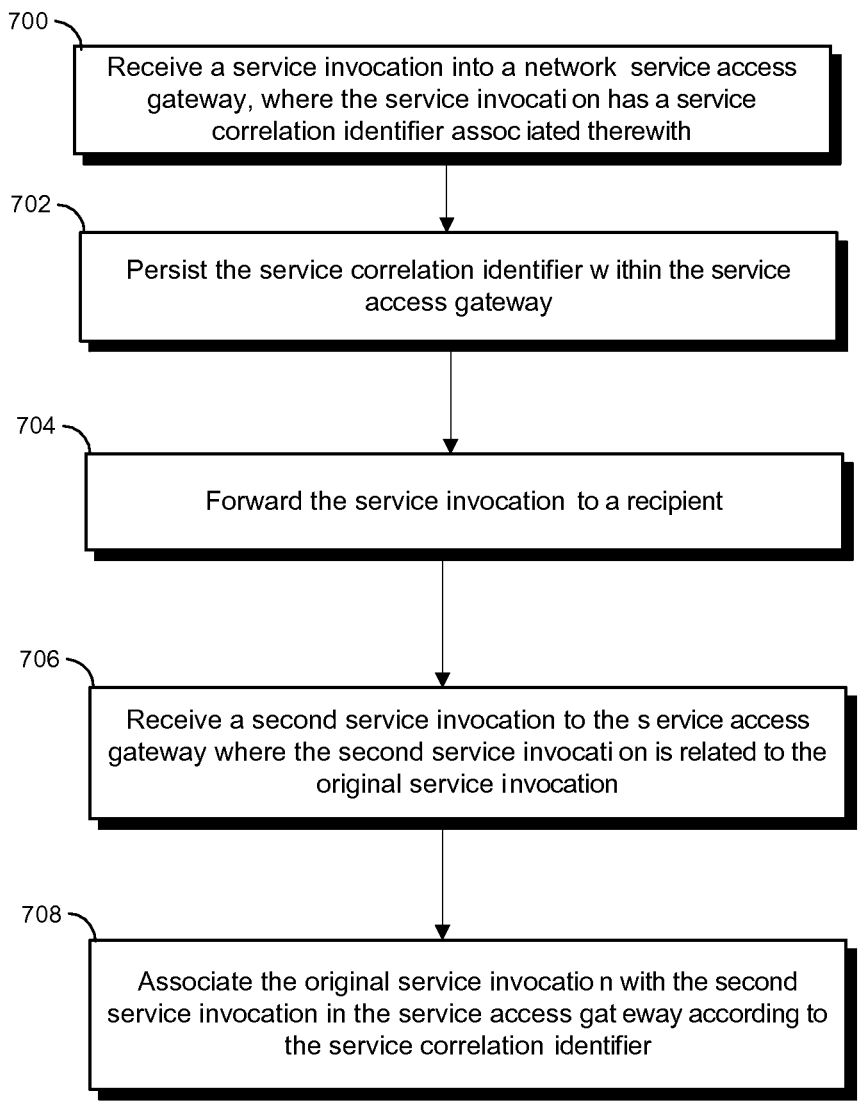
FIG. 7 is an exemplary flow chart diagram of an overall process of the service correlation functionality in accordance with various embodiments.

FIG. 7 is an exemplary flow chart diagram of an overall process of the service correlation functionality in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As shown in step 700, a service invocation is received to a service access gateway. This service invocation has a service correlation identifier (SCID) associated therewith. In step 702, the SCID is persisted in the service access gateway. In one embodiment, the SCID can be recorded in an event data record (EDR). In alternative embodiments, the SCID can also be persisted in various other ways, such as storing the SCID in a work context or other component. In step 704, the service invocation is forwarded to the intended recipient.

In step 706, a second service invocation is received to the access gateway, wherein the second service invocation is related to the original service invocation. In one embodiment, the second invocation can contain an identical SCID as the first invocation. In step 708, the second service invocation is associated with the first service invocation according to the correlation identifier.

Figure 8:
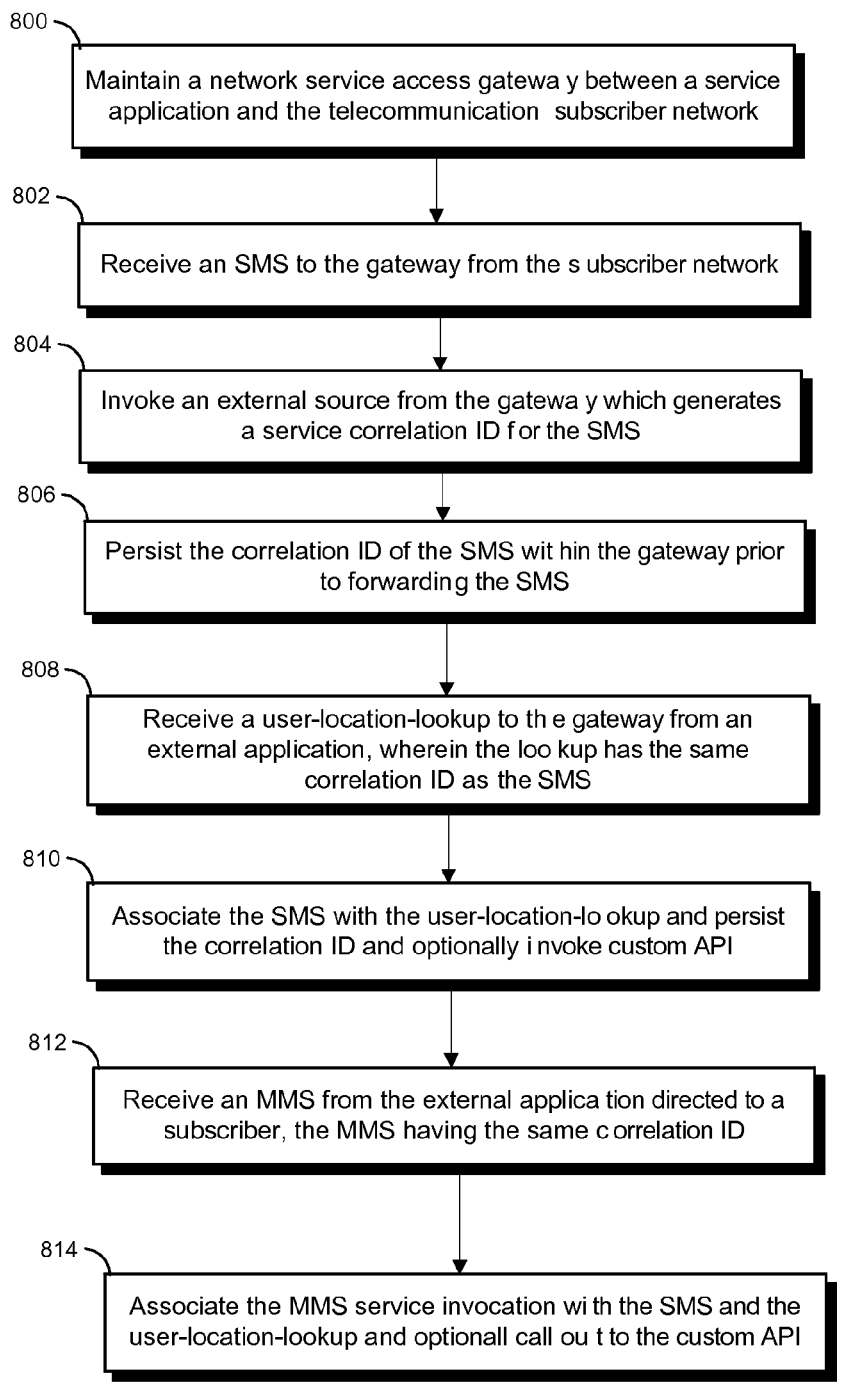
FIG. 8 is an exemplary flow chart diagram of use case for the service correlation functionality in accordance with various embodiments.

FIG. 8 is an exemplary flow chart diagram of use case for the service correlation functionality in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As shown in step 800, a network gateway is maintained between the service provider applications and the telecom subscriber network. In step 802, an SMS originating in the subscriber network is received to the access gateway. In step 804, an external source can be invoked which generates the service correlation ID for the SMS. In one embodiment, the source can be an external custom object residing outside of the gateway. In step 806, the correlation ID of the SMS is persisted within the access gateway before forwarding the SMS to the recipient.

In step 808, a user location lookup request is received to the gateway from an external application. In one embodiment, the lookup request can have the same service correlation ID (SCID) as the SMS. In step 810, the SMS is then associated with the user location lookup request. The correlation ID is also persisted within the gateway and a custom API can be invoked to perform functionality based on the association of the two service invocations.

In step 812, an MMS can be received from the external application. This MMS can contain multimedia content directed to the subscriber that initiated the first SMS message. In one embodiment, the MMS will have the same SCID associated therewith. In step 814, the MMS can be associated with both the prior SMS and the user location lookup. Optionally, the custom API can once again be invoked in order to perform specified function, such as updating the billing system charges for the processing of all three requests. As an illustration, the provider may choose to combine these three service invocations into a single transaction and to bill one charge for all three messages. Of course, various other use cases are also possible and the present disclosure is not intended to be limited to this or any other specific use case.

In various aspects, the embodiments previously described encompass computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the machine readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, virtual machines and user applications.

Included in the programming (software) of the general/specialized computer or microprocessor are software modules for implementing the teachings of the present invention, including, but not limited to providing mechanisms and methods for providing service correlation, as discussed herein.

Various embodiments can be (by way of example and without limitation) used in conjunction with services such as:

VoIP services, including, without limitation the following features:

Basic features. These include standards services such as Voice mail, Caller ID, Call waiting, and call forwarding (the ability to forward a call to a different number).

Advanced features:

Call logs: The ability to view calls made over a given period of time online, ability to associate names with phone numbers, integrate call log information to other applications such as instant messaging (IM).

Do not disturb: The ability to specify policies around receiving calls-for example, all calls during office hours to be automatically forwarded to a mobile terminal, all calls during the night to be directed to voice mail etc.

Locate me: This is advanced call forwarding. Rather than have all calls forwarded to a single location (e.g., voice mail) when the caller is busy, Locate me can try multiple terminals in series or in parallel. For example, a user may have two office locations, a mobile, and a pager, and it may make sense to forward a call to both office locations first, then the pager, and then the mobile terminal. Locate me is another example of feature interaction.

Personal conferencing: A user could use an existing application (e.g., IM client) to schedule a Web/audio conference to start at a certain time. Since the IM client already has personal profile information, the conferencing system sends out the Web conference link information either through IM and/or email to the participants. The phone contact information in the profile is used to automatically ring the participants at the time of the conference.

Lifetime number: This is the facility where a single virtual number can travel with a customer wherever they live. Even if they move, the old number continues to work, and reaches them at their new location. This is really the analog of static IP addresses in a phone network.

Speed dial: This is the ability to dramatically expand the list of numbers that can be dialed through short-key and accelerator combinations. This is another example of a converged application, since it's very likely that when a user will set up this information when they work through the call logs on the operator user portal, and the updated information needs to be propagated to the network side in real-time.

Media delivery services, including, without limitation the following features:

Depending on the service level agreement users are willing to sign up to, the quality of media delivered (e.g. # of frames per second) will vary. The policy engine enables segmenting the customer base by revenue potential, and to maximize return on investment made in the network.

Context-sensitive applications including, without limitation the following features:

A typical example here is the need for applications that have a short lifetime, extremely high usage peaks within their lifetime, and immediacy. For example, voting on American Idol during the show or immediately afterwards has proved to be an extremely popular application.

Integrated applications including, without limitation the following features:

This class of applications is one that combines wireline and wireless terminal usage scenarios. An example of an integrated application is the following: a mobile terminal user is on a conference call on their way to work. When he reaches his office, he enters a special key sequence to transfer the phone call to his office phone. The transfer happens automatically without the user having to dial in the dial-in information again. It's important to note hear that this capability be available without the use of any specific support from the hand-set (a transfer button for example).

As previously described herein, the term service level agreement (SLA) is an agreement concerning a measurable level of service between a service provider and a service consumer. The SLA can include or define a number of items, including but not limited to bandwidth, request processing, delay and other parameters. In one embodiment, an SLA is implemented as one or more extensible markup language (XML) files. In various embodiments, the terms service and web service are used interchangeably and are intended to be broadly construed to include any application, program or process resident on one or more computing devices capable of providing services to a requester or other recipient, including without limitation, network based applications, web based server resident applications, web portals, search engines, photographic, audio or video information storage applications, e-Commerce applications, backup or other storage applications, sales/revenue planning, marketing, forecasting, accounting, inventory management applications and other business applications and other contemplated computer implemented services. As used herein, the term application broadly includes any data entry, update, query or program that processes data on behalf of a user. Users may be human or computational entities.

As used herein, the term web services protocol is defined as a communications protocol that can be used for providing services between two or more applications over a network. Typical web services protocols include without limitation Short Message Peer-to-Peer protocol (SMPP) protocol, Push Application Protocol (PAP) protocol, Multimedia Messaging Services (MM7) protocol and Internet Message Access Protocol (IMAP) protocol. As used herein, the term legacy protocol is defined as a communications protocol implemented by existing applications or telecommunications systems. As used herein, the term policy is defined as a computational object including information for enforcing a limitation, a decision or otherwise causing a control point to take some action or refrain from taking some action to shape traffic.

As previously mentioned, the various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

The invention claimed is:

1. A method for maintaining service correlation within a network service access gateway, said method comprising:
   receiving a first service invocation into the service access gateway executing on one or more microprocessors, wherein said first service invocation includes a first service correlation identifier contained in a first request context;
   retrieving the first service correlation identifier from the first request context and storing said first service correlation identifier into a work context object, wherein the work context object is used to define properties that flow across remote requests and enable downstream components of the service access gateway to work in a same context of an invoking client;
   forwarding the first service invocation to a recipient;

receiving a second service invocation to the service access gateway, wherein said second service invocation contains a second service correlation identifier in a second request context;

associating the first service invocation with the second service invocation in the service access gateway upon matching the first service correlation identifier with the second service correlation identifier; and performing one or more functions based on the associations between the first and second service invocations using a custom service correlation service that implements an extensible application programming interface.

2. The method of claim 1, wherein using the custom service correlation service further includes:

retrieving the service correlation identifier from the work context object by a work context listener.

3. The method of claim 1, wherein associating the first service invocation with the second service invocation further includes:

attaching the service correlation identifier to a simple object access protocol (SOAP) header of a web service request.

4. The method of claim 1, wherein the first service invocation is a request received from a first application to transmit a message and wherein the second service invocation is a response to said message from a second application.

5. The method of claim 1, wherein the first service invocation is at least one of: a short message service (SMS) message, a multimedia message service (MMS) message and a user location lookup.

6. The method of claim 1, wherein the service access gateway further includes:

a stateless access tier that receives and forwards service requests; and a stateful network tier that receives the service requests from the access tier, wherein the service requests are associated in the network tier.

7. The method of claim 1, further comprising:

receiving a third service invocation and associating the third service invocation with the first and the second service invocation based on the service correlation identifier.

8. The method of claim 7, wherein:

the first service invocation is a short message service (SMS) message received from a telecommunications network subscriber to the service access gateway;

the second service invocation is a user location lookup performed based on said network subscriber; and the third service invocation is a multimedia message service (MMS) message containing digital content transmitted to the network subscriber.

9. The method of claim 1, wherein the service correlation identifier is further stored into an event data record generated by the service access gateway, said event data record additionally capturing transaction information processed by the service access gateway.

10. A system for maintaining service correlation within a network service access gateway, said system comprising:

one or more computers, each including one or more microprocessors;

an application coupled to the network, wherein said application generates a first service invocation that includes a first service correlation identifier contained in a first request context; and a service access gateway executing on the computers, wherein the system is operable to perform the steps comprising receiving the first service invocation, retrieves the first service correlation identifier from the first request context, storing the first service correlation identifier into a work context object, wherein the work context object is used to define properties that flow across remote requests and enable components of the service access gateway to work in a same context of an invoking client, receiving a second service invocation that includes a second service correlation identifier in a second request context, associating the first service invocation with the second service invocation upon matching the first service correlation identifier with the second service correlation identifier, and performing one or more function based on the associations between the first and second service invocations using a custom service correlation service that implements an extensible application programming interface.

11. The system of claim 10, further comprising:

a mobile client device coupled to the network that transmits and receives service invocations to the service access gateway.

12. The system of claim 10, wherein using the custom service correlation service further includes:

retrieving the service correlation identifier from the work context object by a work context listener.

13. The system of claim 10, wherein the service correlation identifier is attached to a simple object access protocol (SOAP) header of a web service request.

14. The system of claim 10, wherein the first service invocation is at least one of: a short message service (SMS) message, a multimedia message service (MMS) message and a user location lookup.

15. The system of claim 10, wherein the service access gateway further includes:

a stateless access tier that receives and forwards service requests; and a stateful network tier that receives the service requests from the access tier, wherein the service requests are associated in the network tier.

16. The system of claim 10, wherein the service access gateway receives a third service invocation and associates the third service invocation with the first and the second service invocation based on the service correlation identifier.

17. The system of claim 16, wherein:

the first service invocation is a short message service (SMS) message received from a telecommunications network subscriber to the service access gateway;

the second service invocation is a user location lookup performed based on said network subscriber; and the third service invocation is a multimedia message service (MMS) message containing digital content transmitted to the network subscriber.

18. A non-transitory computer readable storage medium carrying one or more sequences of instructions for maintaining service correlation within a service access gateway, which instructions, when executed by one or more processors, cause the one or more processors to carry out the steps comprising:

receiving a first service invocation into the service access gateway executing on one or more microprocessors, wherein said first service invocation includes a first service correlation identifier contained in a first request context;

retrieving the first service correlation identifier from the first request context and storing said first service correlation identifier into a work context object, wherein the work context object is used to define properties that flow across remote requests to enable downstream components of the service access gateway to work in a same context of an invoking client;

forwarding the first service invocation to a recipient;

receiving a second service invocation to the service access gateway, wherein said second service invocation contains a second service correlation identifier in a second request context;

associating the first service invocation with the second service invocation in the service access gateway upon matching the first service correlation identifier with the second service correlation identifier; and performing one or more based on the associations between the first and second service invocations using a custom service correlation service that implements an extensible application programming interface.

19. The non-transitory computer readable storage medium of 18, wherein using the custom service correlation service further includes:

retrieving the service correlation identifier from the work context object by a work context listener.

20. The non-transitory computer readable storage medium of 18, wherein associating the first service invocation with the second service invocation further includes:

attaching the service correlation identifier to a simple object access protocol (SOAP) header of a web service request.

* * * * *